(12) United States Patent
Kusaka et al.

(10) Patent No.: US 9,851,547 B2
(45) Date of Patent: Dec. 26, 2017

(54) MICROSCOPE PROVIDED WITH PLURAL OPTICAL UNITS

(71) Applicant: OLYMPUS CORPORATION, Shibuya, Tokyo (JP)

(72) Inventors: Kenichi Kusaka, Tokyo (JP); Atsushi Yonetani, Toyko (JP); Masayoshi Karasawa, Kamiina (JP); Katsuyuki Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 114 days.

(21) Appl. No.: 13/752,991

(22) Filed: Jan. 29, 2013

(65) Prior Publication Data
US 2013/0242383 A1     Sep. 19, 2013

(30) Foreign Application Priority Data
Mar. 14, 2012   (JP) ................ 2012-057838

(51) Int. Cl.
    *G02B 21/04*     (2006.01)
    *G02B 21/00*     (2006.01)
    *G02B 21/16*     (2006.01)

(52) U.S. Cl.
CPC ......... *G02B 21/04* (2013.01); *G02B 21/0076* (2013.01); *G02B 21/0088* (2013.01); *G02B 21/16* (2013.01)

(58) Field of Classification Search
CPC ........ G02B 21/24; G02B 21/22; G02B 21/14; G02B 21/06; G02B 7/001; G02B 26/007; G02B 26/008; G02B 21/04; G02B 21/16; G02B 21/0076; G02B 21/0088; A61B 19/5223; A61B 19/26
USPC ....... 359/368–370, 372, 377, 379, 384, 385, 359/389, 889, 891
See application file for complete search history.

(56) References Cited

U.S. PATENT DOCUMENTS

| | | | |
|---|---|---|---|
| 6,075,643 A | 6/2000 | Nonoda et al. | |
| 6,414,805 B1 | 7/2002 | Reichman et al. | |
| 6,631,226 B1 * | 10/2003 | Schoeppe ............ | G02B 21/002 385/33 |

(Continued)

FOREIGN PATENT DOCUMENTS

| | | |
|---|---|---|
| EP | 1 582 904 A1 | 10/2005 |
| EP | 1 640 759 A1 | 3/2006 |

(Continued)

OTHER PUBLICATIONS

Fester et al, "Olympus IX70 Inverted Microscope Cutaway Diagram", Molecular Expressions Microscopy Primer, p. 1-2, Dec. 1, 2003.*

(Continued)

*Primary Examiner* — Jie Lei
(74) *Attorney, Agent, or Firm* — Holtz, Holtz & Volek PC (57) ABSTRACT

In a microscope having a plurality of optical units each including a filter block between an objective and a tube lens, the optical unit closest to the objective among the plurality of optical units includes a first filter block provided with an optical filter having a first effective diameter. The optical unit closest to the tube lens among the plurality of optical units includes a second filter block provided with an optical filter having a second effective diameter larger than the first effective diameter.

13 Claims, 11 Drawing Sheets

(56) References Cited

U.S. PATENT DOCUMENTS

| RE38,847 E | 10/2005 | Nonoda et al. |
|---|---|---|
| 2005/0068614 A1 | 3/2005 | Yoneyama et al. |
| 2005/0219687 A1 | 10/2005 | Aono et al. |
| 2005/0227231 A1* | 10/2005 | Tcherkassov ................. 435/6 |
| 2006/0066942 A1 | 3/2006 | Kouno et al. |
| 2008/0310016 A1* | 12/2008 | Karasawa et al. ............ 359/383 |
| 2009/0027769 A1 | 1/2009 | Saito et al. |
| 2009/0284833 A1 | 11/2009 | Shimamoto |
| 2011/0043906 A1 | 2/2011 | Saito et al. |
| 2011/0043924 A1 | 2/2011 | Saito et al. |

FOREIGN PATENT DOCUMENTS

| JP | 06073712 U | 10/1994 |
|---|---|---|
| JP | 11223773 A | 8/1999 |
| JP | 2006-091723 A | 4/2006 |
| JP | 2010008989 A | 1/2010 |
| JP | 2011022299 A | 2/2011 |
| JP | 4740448 B2 | 8/2011 |

OTHER PUBLICATIONS

Understanding Optical Specifications, Edmund.*
Extended European Search Report (EESR) dated Oct. 9, 2013 (in English) in counterpart European Application No. 13153597.3.
Japanese Office Action (and English translation thereof) dated Jan. 26, 2016, issued in counterpart Japanese Application No. 2012-057838.

* cited by examiner

MICROSCOPE PROVIDED WITH PLURAL OPTICAL UNITS

CROSS REFERENCE TO RELATED APPLICATIONS

This application is based upon and claims the benefit of priority from the prior Japanese Patent Application No. 2012-057838, filed Mar. 14, 2012, the entire contents of which are incorporated herein by reference.

BACKGROUND OF THE INVENTION

Field of the Invention

The present invention is related to a microscope provided with a plurality of optical units for autofocus (hereafter referred to as AF), observation, light stimulus, etc., each including a filter block.

Description of the Related Art

In the field of biomicroscopes, there is a well known microscope having various functions including not only the function of illuminating and observing a cultivated sample, but also the function of stimulating the cultivated sample with light and the AF function of correcting an out-of-focus image to observe the cultivated sample for a long time.

The various functions are realized by providing between an objective and a tube lens an optical unit for light stimulus to introduce stimulus light to the optical axis and for AF to introduce autofocus light to the optical axis of an objective in addition to an optical unit for a fluorescent observation conventionally provided to introduce excitation light to the optical axis of an objective.

The microscope provided with a plurality of optical units between an objective and a tube lens is disclosed by, for example, Japanese Laid-open Patent Publication No. 2006-091723. The microscope disclosed by Japanese Laid-open Patent Publication No. 2006-091723 is an inverted microscope provided between an objective and a tube lens with an optical unit including a dichroic mirror for introducing light from a lamplight source, and an optical unit including a dichroic mirror for introducing laser light from a laser.

With the microscope provided with an infinity-corrected objective, on-axis light is emitted as luminous flux parallel to an optical axis from an objective to a tube lens while off-axis light is emitted as parallel flux inclined with respect to the optical axis from the objective to the tube lens.

SUMMARY OF THE INVENTION

The first aspect of the present invention is to provide a microscope having a plurality of optical units each including a filter block between an objective and a tube lens. Among the plurality of optical units, the optical unit closest to the objective includes a first filter block provided with an optical filter having a first effective diameter. Among the plurality of optical units, the optical unit closest to the tube lens includes a second filter block provided with an optical filter having a second effective diameter larger than the first effective diameter.

BRIEF DESCRIPTION OF THE DRAWINGS

The present invention will be more apparent from the following detailed description when the accompanying drawings are referenced.

DESCRIPTION OF THE PREFERRED EMBODIMENTS

Embodiment 1

Figure 1:
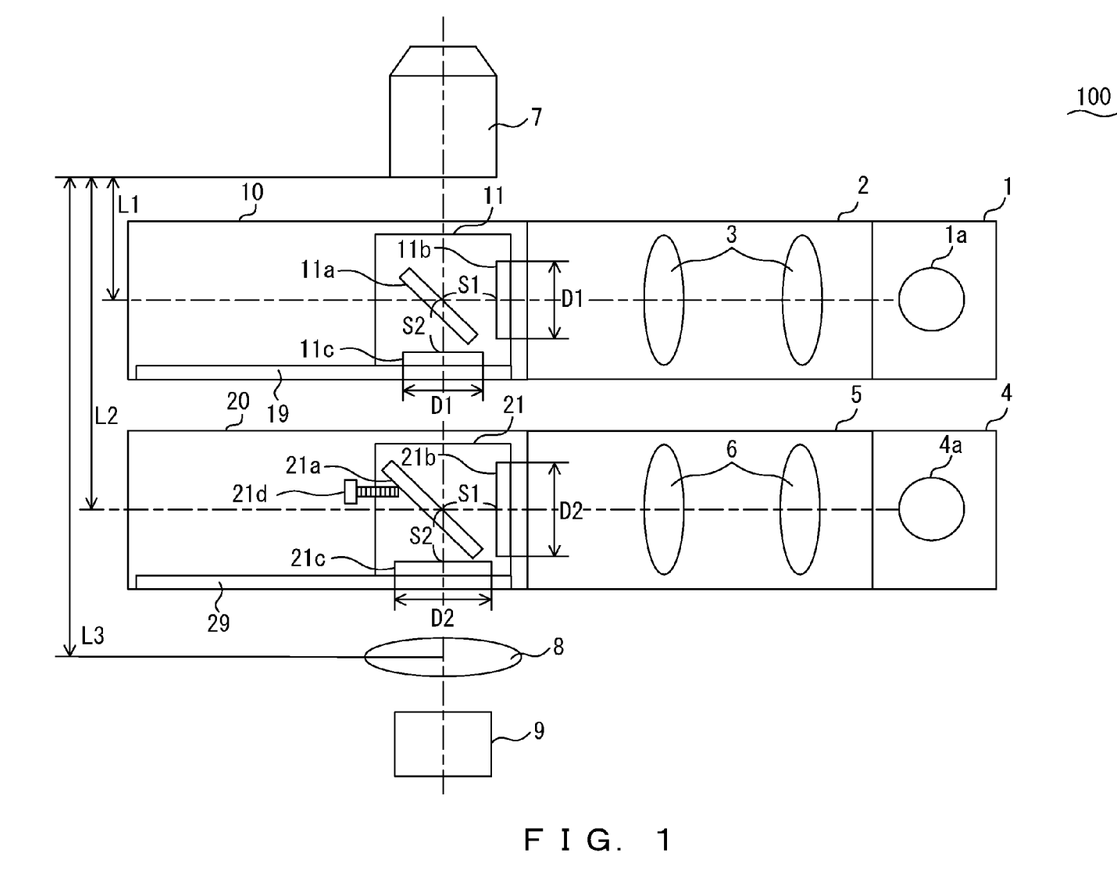
FIG. 1 is a diagram illustrating a configuration of the microscope according to embodiment 1 of the present invention.
Figure 2A:
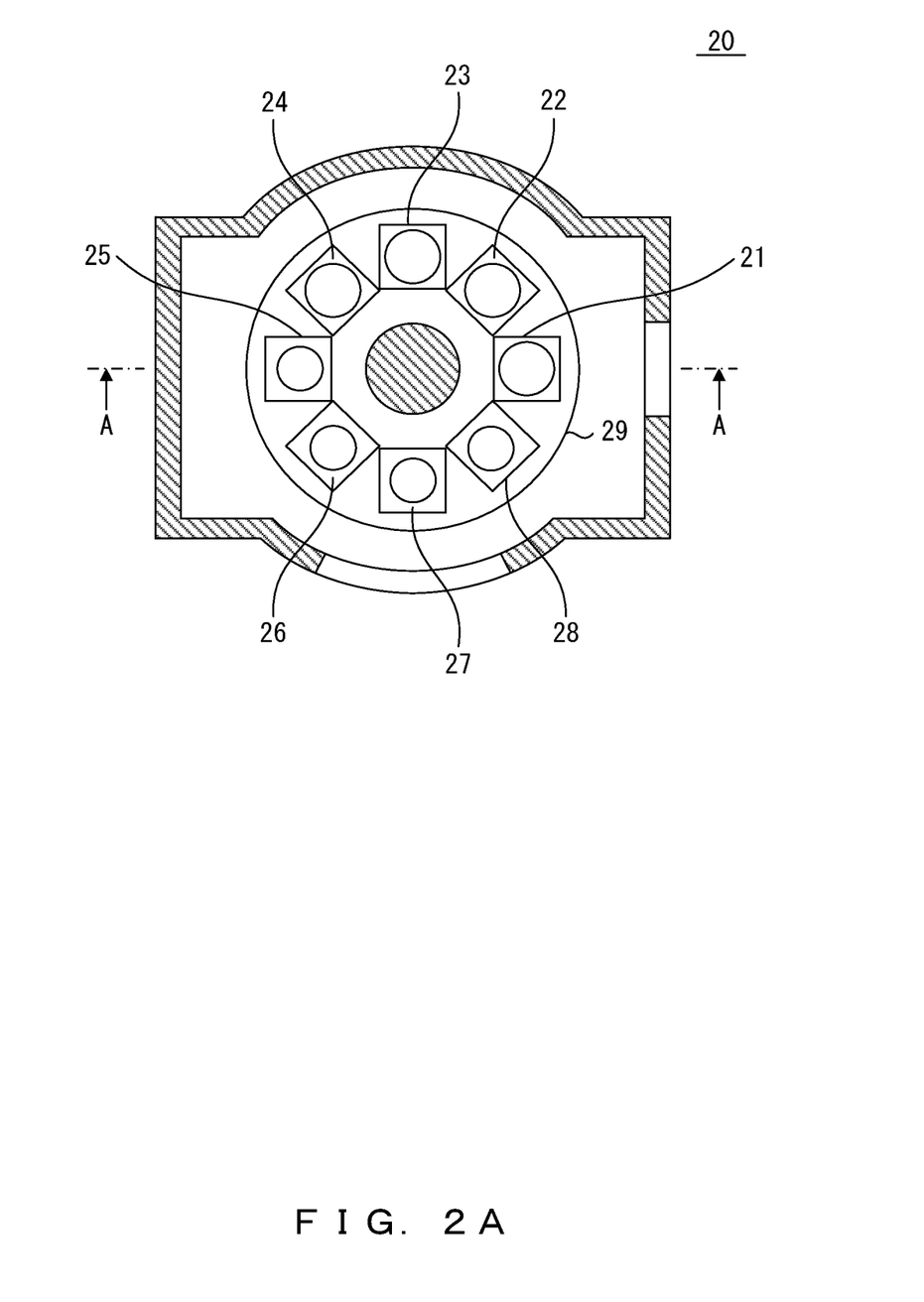
FIG. 2A is a sectional view of the section, which is orthogonal to the optical axis, of the filter block switch mechanism of the optical unit closest to the tube lens illustrated in FIG. 1.
Figure 2B:
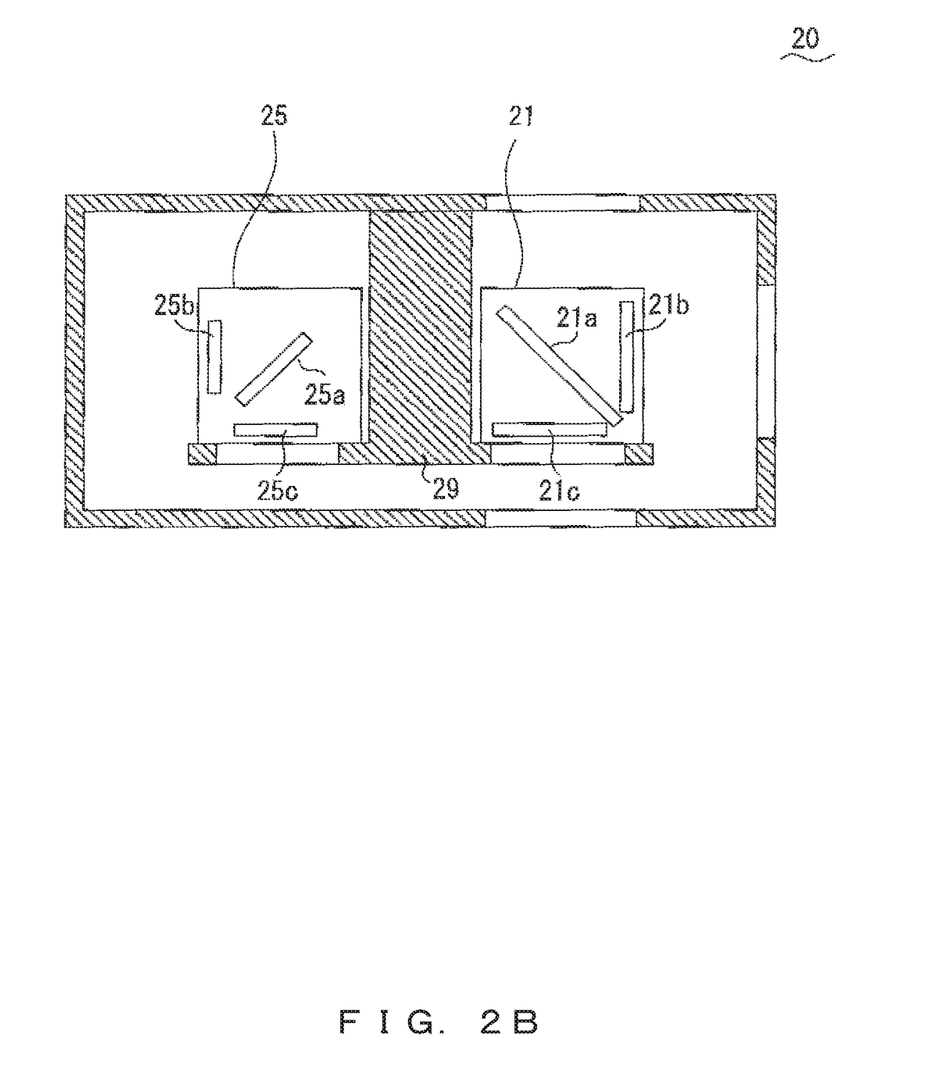
FIG. 2B is a sectional view at the A-A section illustrated in FIG. 2A of the filter block switch mechanism of the optical unit closest to the tube lens illustrated in FIG. 1.

FIG. 1 is a diagram illustrating a configuration of the microscope according to embodiment 1 of the present invention. FIGS. 2A and 2B are views of the filter block switch mechanism of the optical unit closest to the tube lens provided for the microscope illustrated in FIG. 1. FIG. 2A is a sectional view of the section orthogonal to the optical axis of the objective. FIG. 2B is a sectional view at the A-A section illustrated in FIG. 2A.

A microscope 100 exemplified in FIG. 1 is an inverted microscope provided with a plurality of optical units (optical units 10 and 20) between an objective 7 and a tube lens 8.

The optical unit 10 closest to the objective 7 is an optical unit for introducing the stimulus light in the UV (ultraviolet) area emitted from a stimulus light source 1a in a lamp house 1 to the optical axis of the objective 7 through a lens group 3 in a projector tube 2. The stimulus light introduced to the optical unit 10 stimulates a sample through the objective 7.

The optical unit 10 includes a switch mechanism 19 which a plurality of filter blocks can be mounted on and which selectively arranges one of a plurality of filter blocks on the optical axis of the objective 7, and a plurality of filters provided on the switch mechanism 19. In FIG. 1, only a filter block 11 arranged on the optical axis is illustrated in the plurality of filters provided for the switch mechanism 19.

The filter block 11 (first filter block) includes a dichroic mirror 11a which reflects the stimulus light in the UV area and passes fluorescence from a sample, an excitation filter 11b, and an emission filter 11c of the same size as the excitation filter 11b.

The size of the optical filters, that is, the excitation filter 11b and the emission filter 11c, is a common optical filter size. For example, the outer diameter may be 25 mm, and the effective diameter (first effective diameter) D1 is 22 mm. The size of the dichroic mirror 11a is a common dichroic mirror size. For example, it may be (short side×long side× thickness)=(26 mm×36 mm×1 mm). The distance S1 from the dichroic mirror 11a to the excitation filter 11b is approximately equal to the distance S2 from the dichroic mirror 11a to the emission filter 11c, and each of the distances is about 18 mm, 15 mm. The distance L1 from the contact surface of the objective 7 to the intersection of the optical axis and the dichroic mirror 11a is, for example, 70 mm, and there is a revolver or an up-and-down mechanism of a revolver between the contact surface and the intersection, although it is not illustrated in the attached drawings.

Note that the contact surface is a surface of the objective barrel with which the microscope body comes into contact when the objective is attached to the microscope body. The contact surface is the basis of a parfocal length.

The optical unit 20 closest to the tube lens 8 is an optical unit for introducing the excitation light emitted from an excitation light source 4a in a lamp house 4 to the optical axis of the objective 7 through a lens group 6 in a projector tube 5. The excitation light introduced to the optical unit 20 is emitted to the entire sample through the objective 7.

The optical unit 20 includes a switch mechanism 29 which a plurality of filter blocks can be mounted on and which selectively arranges one of a plurality of filter blocks on the optical axis of the objective 7, and a plurality of filter blocks provided for the switch mechanism 29. In FIG. 1, only a filter block 21 arranged on the optical axis is illustrated in the plurality of filters arranged for the switch mechanism 29.

In more detail, in the optical unit 20, as exemplified in FIGS. 2A and 2B, a plurality of filter blocks 21, 22, 23, 24, 25, 26, 27, and 28 are provided arranged concentrically on the switch mechanism 29 as a turret.

The filter block 21 (second filter block) includes a dichroic mirror 21a which reflects excitation light and passes the fluorescence from a sample, an excitation filter 21b, an emission filter 21c in the same size as the excitation filter 21b, and a mechanism for adjusting the angle of the dichroic mirror 21a. The mechanism for adjusting the angle may be a method of interposing a thin foil between a dichroic mirror and a frame of a filter block, or a mechanism which adjusts the angle of the reflection surface of the dichroic mirror by adjusting a screw unit 21d illustrated in FIG. 1 which presses on the attachment surface of the dichroic mirror formed on the filter block 21 via a plurality of screws. In FIG. 1, the screw directly touches the dichroic mirror to adjust the angle of the reflection surface, but the angle of the attachment surface of the dichroic mirror may be adjusted by the screw to indirectly adjust the angle of the reflection surface.

The optical filters, that is, the excitation filter 21b and the emission filter 21c, are larger than the optical filter included in the filter block 11. For example, the outer diameter is 30 mm, and the effective diameter (second effective diameter) D2 is 28 mm. The dichroic mirror 21a is larger than the dichroic mirror 11a included in the filter block 11, and is, for example, (short side×long side×thickness)=(30 mm×42 mm×1 mm). The distance S1 from the dichroic mirror 21a to the excitation filter 21b is 18 mm, and the distance S2 from dichroic mirror 21a to the emission filter 21c is 15 mm. The distance L2 from the contact surface of the objective 7 to the intersection of the optical axis of the objective 7 and the dichroic mirror 21a is, for example, 140 mm, and the distance L3 from the contact surface of the objective 7 to the tube lens 8 is, for example, 190 mm.

Each of the filter blocks 22, 23, and 24 includes a dichroic mirror, an excitation filter, and an emission filter, and the size of the dichroic mirror, the excitation filter, and the emission filter of each filter block is the same as the dichroic mirror, the excitation filter, and the emission filter of the filter block 21.

A filter block 25 (third filter block) includes a dichroic mirror 25a which reflects excitation light and passes the fluorescence from a sample, an excitation filter 25b, and an emission filter 25c which is as large as the excitation filter 25b.

The optical filters, that is, the excitation filters 25b and 25c, are as large as the optical filter included in the filter block 11. For example, the outer diameter is 25 mm, and the effective diameter (first effective diameter) D1 is 22 mm. The dichroic mirror 25a is as large as the dichroic mirror 11a included in the filter block 11. For example, it is (short side×long side×thickness)=(26 mm×36 mm×1 mm).

Each of the filter blocks 26, 27, and 28 includes a dichroic mirror, an excitation filter, and an emission filter. The dichroic mirror, the excitation filter, and the emission filter of each filter block are as large as the dichroic mirror, the excitation filter, and the emission filter of the filter block 25.

That is, the switch mechanism 29 is configured to be provided with two types of filter blocks (second filter block, third filter block) having different effective optical filter diameters.

The two types of filter blocks having different effective optical filter diameters have common-sized attachment units even though the widths of filter blocks are different. As illustrated in FIG. 1, the position of the optical axis is identical between the two. Therefore, the two types of filter blocks are compatible, and can be replaced with each other. Accordingly, in FIG. 2A, the switch mechanism 29 is provided with each four filter blocks of two types. The rate between the two types of filter blocks may be arbitrarily changed. For example, the switch mechanism 29 may be provided with eight filter blocks having large effective optical filter diameters, and may be provided with eight filter blocks having small optical filter effective diameters. That is, regardless of the type of filter block, the maximum number of filter blocks on switch mechanism 29 to be provided is eight.

The sizes of two types of filter blocks may be identical, and only the effective diameters of the optical filters may be different from each other.

In the microscope 100 configured as described above, the effective diameter of the optical filter in the filter block 21 included in the optical unit 20 closest to the tube lens 8 is configured to be larger than the effective diameter of the optical filter in the filter block 11 included in the optical unit 10 closest to the objective 7. Also the dichroic mirror 21a in the filter block 21 is configured to be larger than the dichroic mirror 11a in the filter block 11. Thus, the occurrence of the vignetting of the off-axis light in the filter block 21 closest to the tube lens 8 which is farthest from the objective 7 is suppressed, thereby reducing the degradation of the peripheral light quantity. Therefore, in the microscope 100, a large observation field may be secured with various functions which are realized by a plurality of optical units.

Also with the microscope 100, when the sizes of the two types of filter blocks having different effective optical filter diameters are substantially the same, and the dimension of the attachment unit is common, the two types of filter blocks may be compatible. Thus, two filter blocks having different effective optical filter diameters may be compatibly provided, and a necessary number of filter blocks of any type may be provided. By considering that a filter block having an optical filter larger than a common size is more expensive, and that there is a strong likelihood that a user has a filter block having a common size optical filter, the configuration in which a filter block having a large optical filter is used only when it is necessary to concurrently provide filter blocks having different effective optical filter diameters may be a considerable merit in cost for the user.

To efficiently suppress the occurrence of vignetting of off-axis light in the filter block 21, and secure the compatibility between the filter block 11 having a common size optical filter and the filter block 21 having a large optical filter, it is preferable that the microscope 100 satisfy the following conditional expression (1), and it is more preferable that the microscope 100 satisfy the conditional expression (2).

$$1.1 \leq D2/D1 \leq 1.5 \quad (1)$$

$$12 < f \times (D2-D1)/(L2-L1) < 31 \quad (2)$$

where D1 indicates an effective diameter of the optical filter in the filter block 11 included in the optical unit 10 closest to the objective 7, and D2 indicates an effective diameter of the optical filter in the filter block 21 included in the optical unit 20 closest to the tube lens 8. "f" indicates the focal length of the tube lens 8. L1 indicates the distance from the contact surface of the objective 7 to the intersection of the optical axis of the objective 7 and the dichroic mirror 11a, and L2 indicates the distance from the contact surface of the objective 7 to the intersection of the optical axis of the objective 7 and the dichroic mirror 21a.

The conditional expression (1) regulates the ratio of the effective diameters of the optical filter included in the filter block 11 and the optical filter included in the filter block 21. When the obtained value is lower than the lower limit of the conditional expression (1), there is almost no effect of suppressing the vignetting of the off-axis light in the filter block 21. On the other hand, when the obtained value is higher than the upper limit of the conditional expression (1), the effective diameter of the optical filter included in the filter block 21 is too large with respect to the effective diameter of the optical filter included in the filter block 11, thereby making it difficult to keep the filter block 11 as large as the filter block 21.

The conditional expression (2) regulates the effective diameter of an optical filter by considering the interval between the filter block 11 and the filter block 21. When the obtained value is lower than the lower limit of the conditional expression (2), it is difficult to suppress the vignetting of the off-axis light in the filter block 21 with a microscope having a field number of 18 or more. On the other hand, when the obtained value is higher than the upper limit of the conditional expression (2), the effective diameter of the optical filter included in the filter block 21 is too large with respect to the effective diameter of the optical filter included in the filter block 11, thereby making it difficult to keep the filter block 11 as large as the filter block 21.

In the case of the microscope 100 exemplified in FIG. 1, since the effective diameter D1=22 mm, the effective diameter D2=28 mm, and D2/D1=1.27, the conditional expression (1) is satisfied. In addition, the distance L1=70 mm, the distance L2=140 mm, the focal length f=180 mm, and f×(D2−D1)/(L2−L1)=15.4, and the conditional expression (2) is satisfied.

Furthermore, to secure the compatibility between the filter block 11 including the common-size dichroic mirror 11a and the filter block 21 including the large-size dichroic mirror 21a, it is preferable that the dichroic mirror 21a be an octagon with four chamfered corners.

Figure 3:
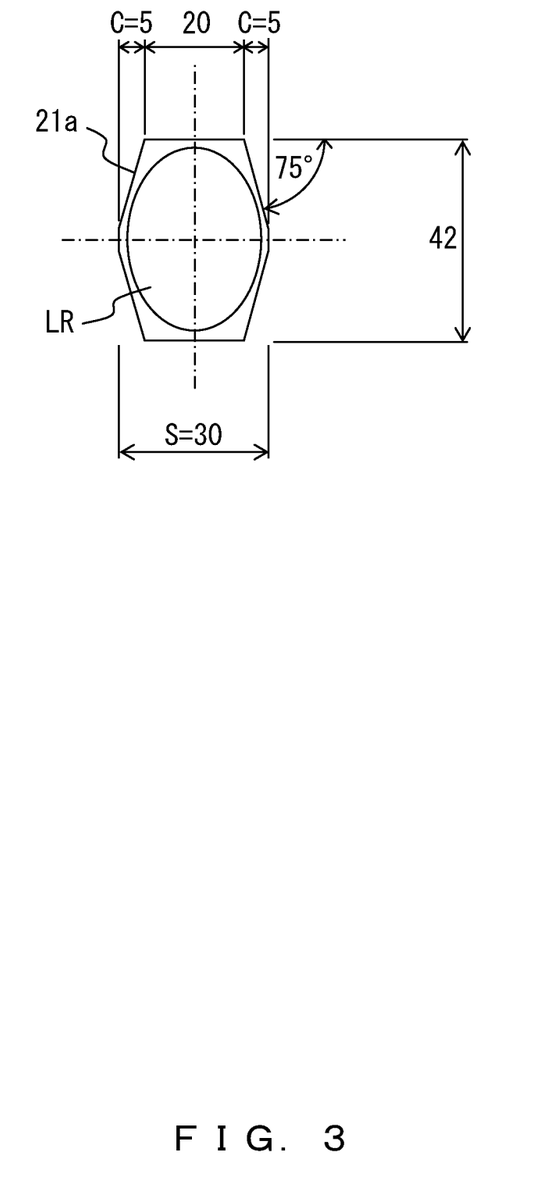
FIG. 3 illustrates the shape of the dichroic mirror included in the optical unit closest to the tube lens illustrated in FIG. 1.
Figure 4:
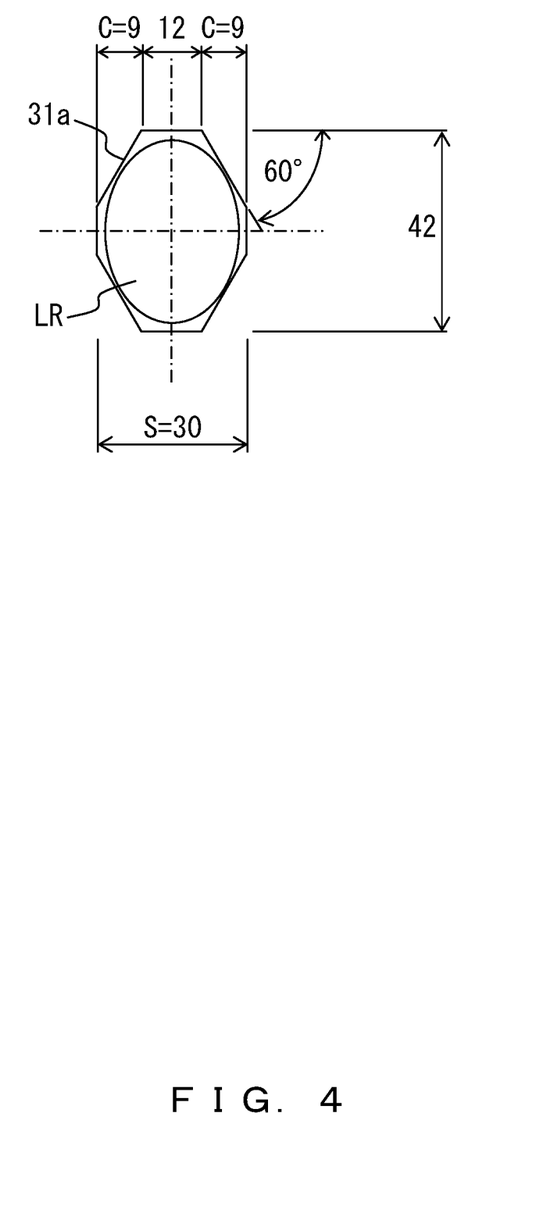
FIG. 4 illustrates another shape of the dichroic mirror included in the optical unit closest to the tube lens illustrated in FIG. 1.

FIG. 3 is a shape of the dichroic mirror included in the filter block 21. FIG. 4 is another shape of the dichroic mirror included in the filter block 21. As illustrated in FIG. 3, by having the dichroic mirror 21a be an octagon with four chamfered corners, the dichroic mirror 21a, which is larger than the dichroic mirror 11a, may be stored in the filter block 21, which is substantially as large as the filter block 11 including the dichroic mirror 11a. Thus, the sizes of the two types of filter blocks having different optical filter effective diameters may be substantially equal to each other.

Since the dichroic mirror 21a is inclined at 45 degrees with respect to the optical axis, the range LR of the luminous flux which enters the dichroic mirror 21a is oval shaped. Therefore, to maximize the chamfered area (hereafter referred to as a chamfered portion) within the scope of the not-overlapping range LR of the luminous flux, it is preferable that chamfer of the four corners of the dichroic mirror 21a be at a large angle with respect to the short side of the dichroic mirror 21a, which is parallel to the short axis of the oval. Concretely, it is preferable that the chamfering angle be equal to or higher than 55 degrees and equal to or lower than 80 degrees with respect to the short side. Therefore, although the dichroic mirror 21a is exemplified in FIG. 3, with the four corners chamfered at a chamfering angle of 75 degrees with respect to the short side, the filter block 21 may include, in place of a dichroic mirror 21a, a dichroic mirror 31a having the four corners illustrated in FIG. 4 chamfered at a chamfering angle of 60 degrees with respect to the short side.

Furthermore, although the chamfering angle satisfies the conditions above, the chamfered portion is not necessarily large. Therefore, it is preferable that the dichroic mirror 21a satisfy the following conditional expression (3) in addition to the condition of the chamfering angle above.

$$0.3 \leq 2 \times C/S \leq 0.7 \quad (3)$$

where S indicates the length of the short side (that is, the length of the dichroic mirror 21a in the direction of a short axis) of the dichroic mirror 21a included in the filter block 21 before the chamfering process, and C indicates the length of each chamfered portion in the direction of the short side formed at the four corners of the dichroic mirror 21a included in the filter block 21.

The conditional expression (3) regulates the ratio of the length of the chamfered portion in the direction of the short side to the length of the short side before the chamfering process. That is, the lower limit of 0.3 indicates the state in which 30% of the short side before the chamfering process is chamfered, and the upper limit of 0.7 indicates the state in which the 70% of the short side before the chamfering process is chamfered.

If the obtained value is lower than the lower limit of the conditional expression (3), the chamfered portion is too small. Therefore, it is difficult to store the dichroic mirror 21a in the filter block 21. On the other hand, if the obtained value exceeds the upper limit of the conditional expression (3), the chamfered portion is too large, and the chamfered portion overlaps the range LR of the luminous flux. As a result, a portion of incident light bypasses the dichroic mirror 21a without entering the dichroic mirror 21a.

In the case of the dichroic mirror 21a exemplified in FIG. 3, the length S of the short side is 30 mm and the length C of the chamfered portion in the direction of the short side is 5 mm, thereby obtaining 2×C/S=0.33 and satisfying the conditional expression (3). In addition, in the case of the dichroic mirror 31a exemplified in FIG. 4, the length S of the short side is 30 mm, and the length C of the chamfered portion in the direction of the short side is 9 mm, thereby obtaining 2×C/S=0.6 and satisfying the conditional expression (3).

Figure 5A:
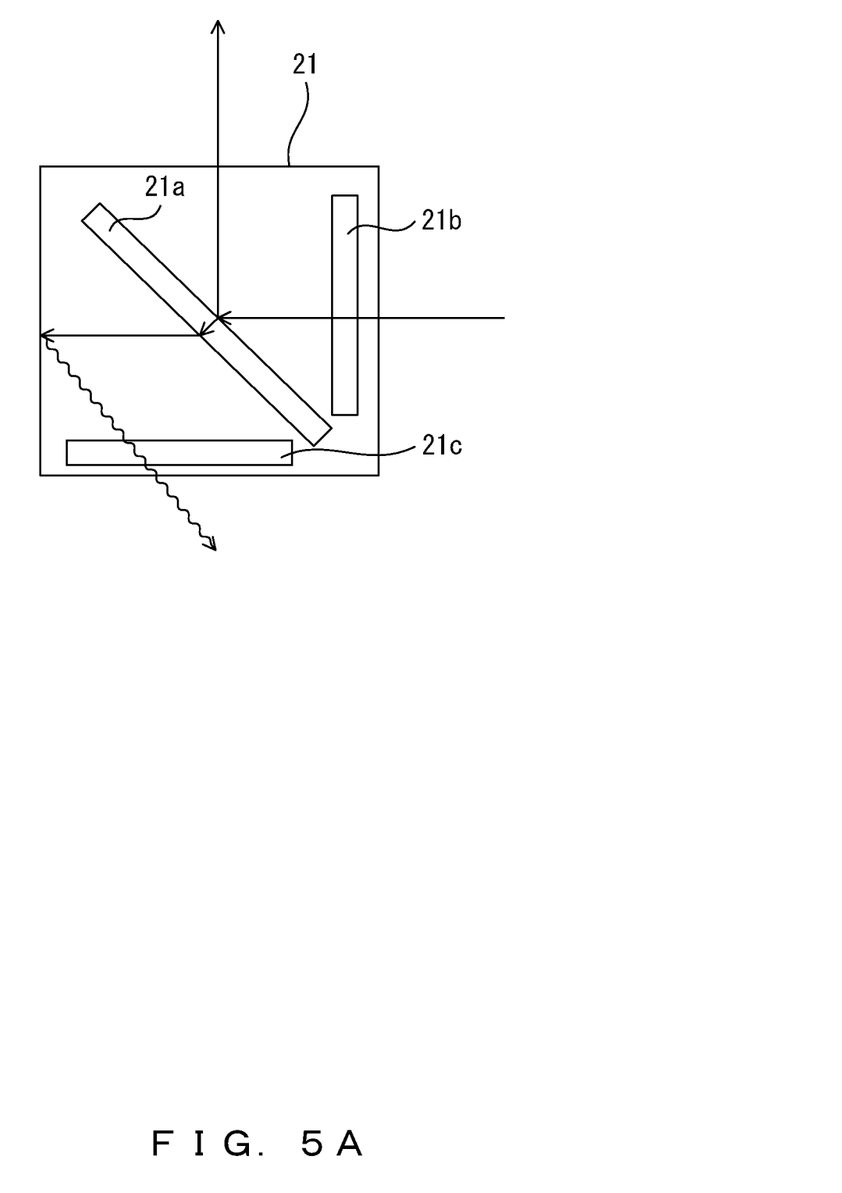
FIG. 5A is an explanatory view of the leakage light caused by the dichroic mirror included in the optical unit closest to the tube lens illustrated in FIG. 1.
Figure 5B:
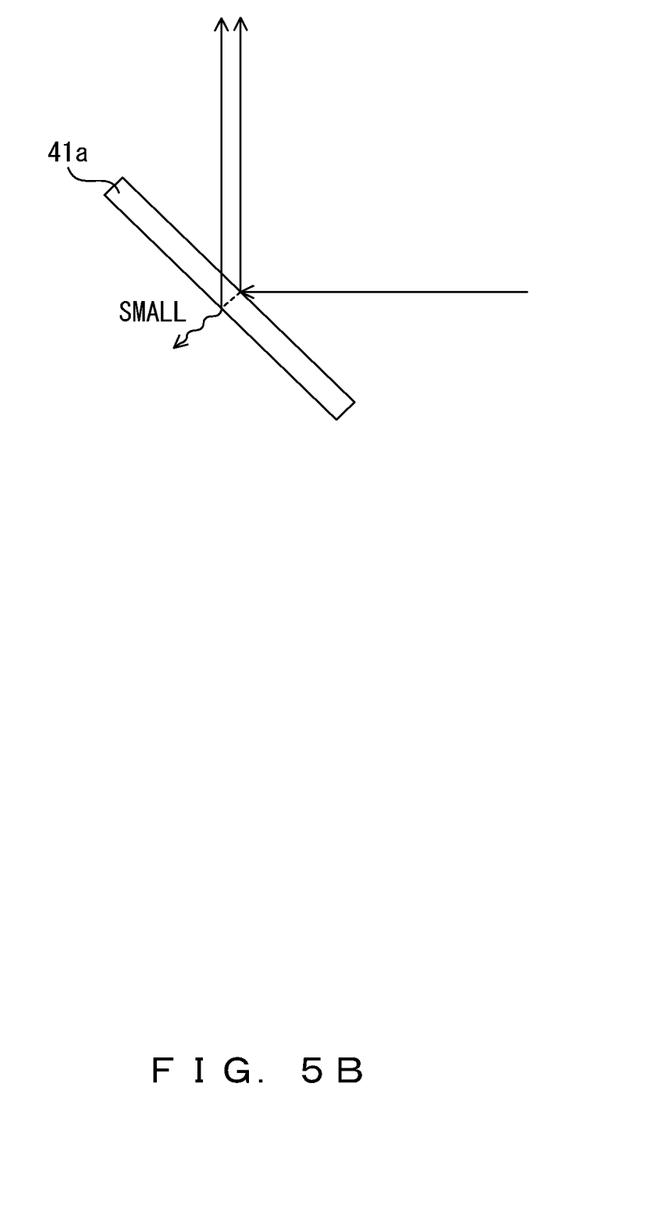
FIG. 5B is an explanatory view of a variation example of the dichroic mirror included in the optical unit closest to the tube lens illustrated in FIG. 1.

Furthermore, as illustrated in FIG. 5A, since the optical filter is larger than the conventional filter, the filter block 21 is configured to easily reflect the excitation light leaking from the dichroic mirror 21a (hereafter referred to as leakage light) and allow the light to enter the detection optical path. Therefore, as illustrated in FIG. 5B, it is preferable that the filter block 21 include a dichroic mirror 41a both sides of whose substrates are coated with an interference coating instead of the dichroic mirror 21a. Using a dichroic mirror 41a having both sides coated with an interference coating, the light quantity of the leakage light may be suppressed.

In addition, as illustrated in FIG. 1, it is preferable that the filter block 21 included in the optical unit 20 closest to the tube lens 8 be provided with a device for rotating the dichroic mirror 21a and adjusting the angle with respect to the optical axis. An example would be a mechanism for changing the angle by pressing the surface of the dichroic mirror by the screw unit 21d. Since the dichroic mirror 21a is farther from the objective 7 than the dichroic mirror 11a, the change in the illumination position is large in accordance with the angle error. Therefore, it is necessary to set the angle of the dichroic mirror 21a with respect to the optical axis with a high accuracy. With the microscope 100, the angle of the dichroic mirror 21a may be appropriately adjusted by providing the angle adjusting mechanism for the dichroic mirror. It is preferable that the mechanism for adjusting the angle of the dichroic mirror be similarly provided for other filter blocks in the optical unit 20.

Figure 6:
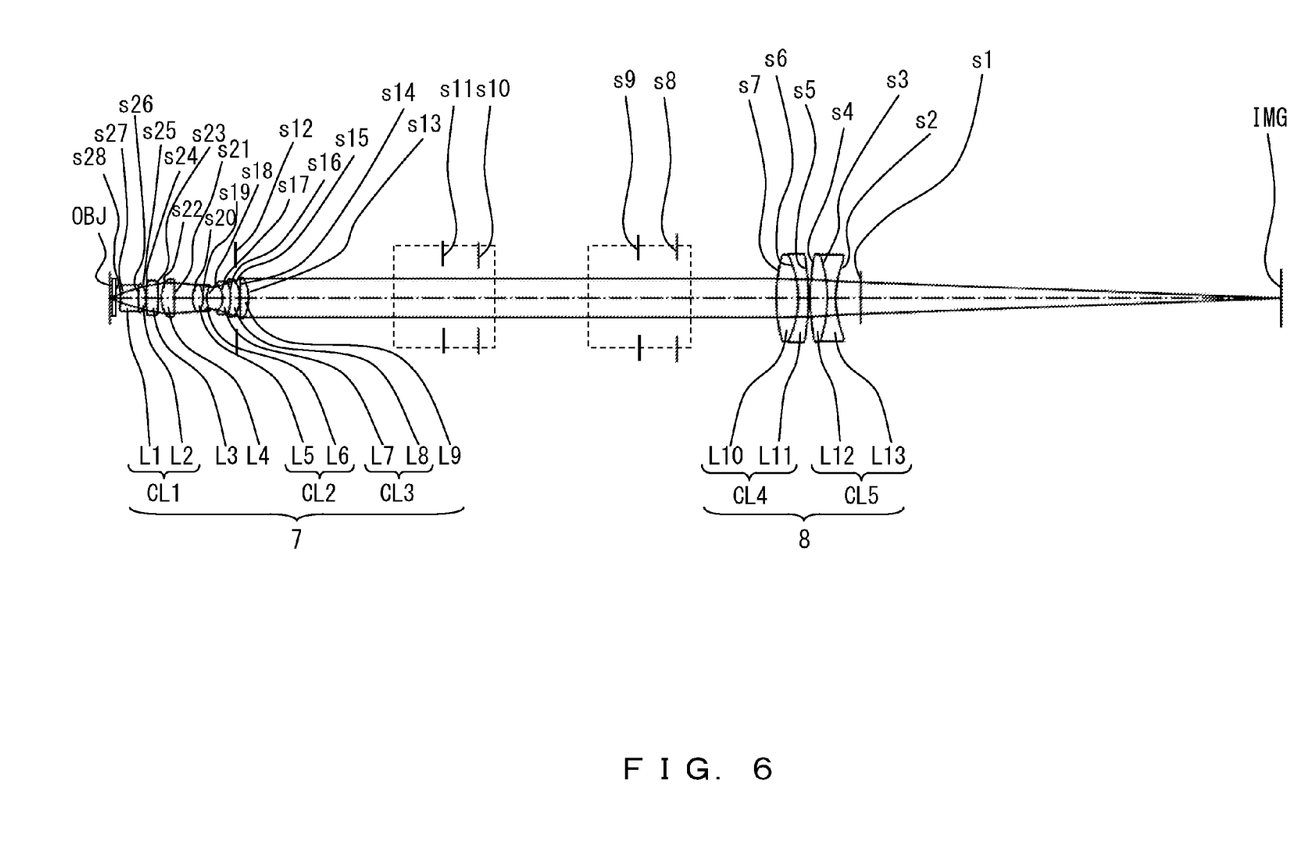
FIG. 6 is a sectional view of the optical system from the objective to the tube lens of the microscope illustrated in FIG. 1.
Figure 7A:
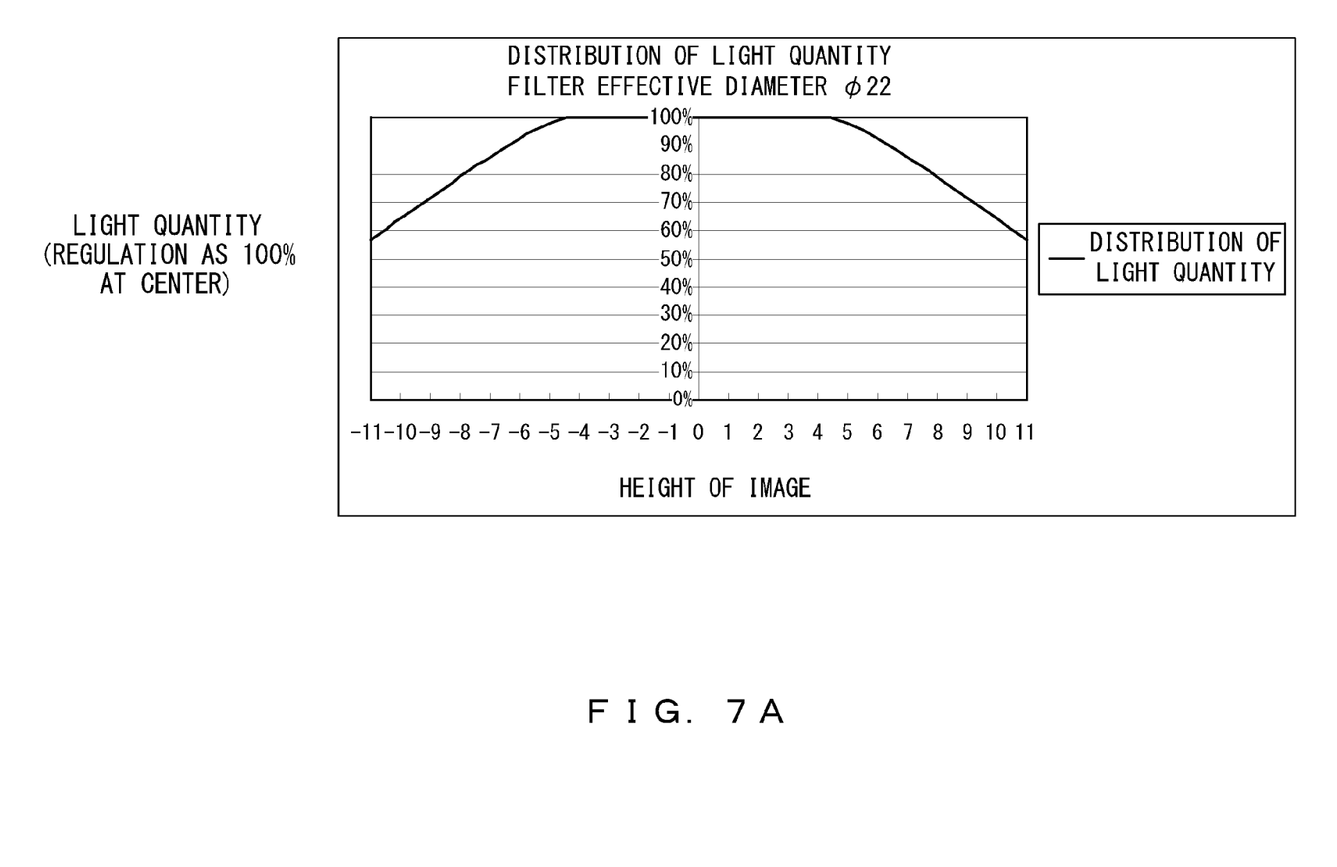
FIG. 7A is a view of the distribution of the light quantity on the image plane when the filter block provided in the optical unit closest to the tube lens illustrated in FIG. 1 includes an optical filter having a small effective diameter.
Figure 7B:
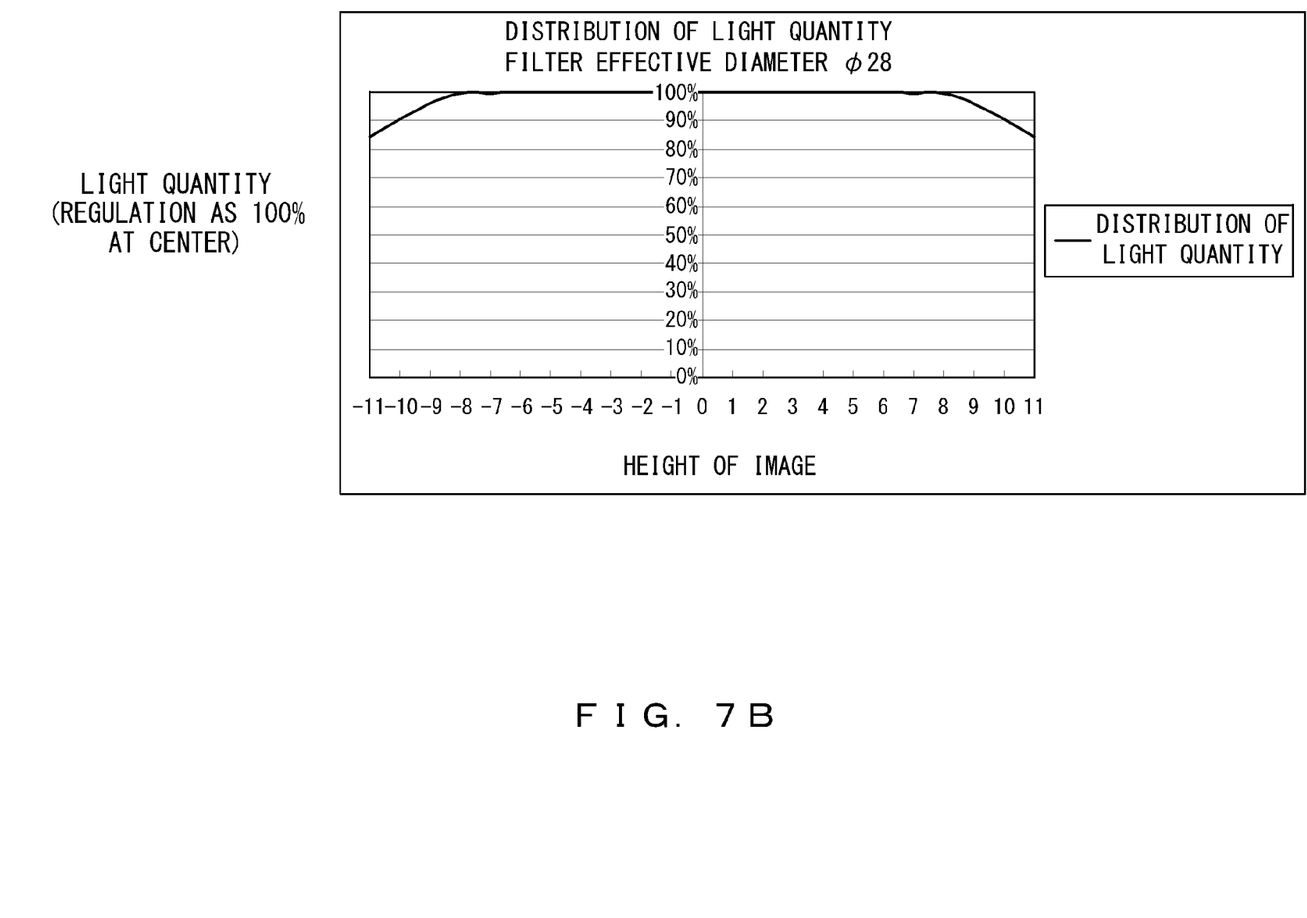
FIG. 7B is a view of the distribution of the light quantity on the image plane when the filter block provided in the optical unit closest to the tube lens illustrated in FIG. 1 includes an optical filter having a large effective diameter.

The difference in light quantity of the detected light which enters an image pickup element 9 between the case in which the filter block 21 including the optical filter having a large effective diameter is arranged on the optical axis in the optical unit 20 of the microscope 100 according to the present embodiment and the case in which the filter block 25 including the optical filter having a small effective diameter is arranged on the optical axis in the optical unit 20 of the microscope 100 according to the present embodiment is described below with reference to FIGS. 6, 7A, and 7B.

FIG. 6 is a sectional view of the optical system from the objective to the tube lens of the microscope according to the present embodiment. The lens data of the optical system illustrated in FIG. 6 is listed below.

| s | r | d | nd | vd |
|---|---|---|---|---|
| IMG | INF | 148.3305 | | |
| 1 | INF | 8.7111 | | |
| 2 | −40.6619 | 3.0298 | 1.64450 | 40.82 |
| 3 | 50.7100 | 6.0238 | 1.83400 | 37.16 |
| 4 | −84.3099 | 0.6973 | | |
| 5 | 102.8477 | 3.4742 | 1.80610 | 40.92 |

-continued

| s | r | d | nd | vd |
|---|---|---|---|---|
| 6 | 37.5679 | 7.7321 | 1.48749 | 70.23 |
| 7 | −68.7541 | 35.0000 | | |
| 8 | INF | 15.0000 | | |
| 9 | INF | 55.0000 | | |
| 10 | INF | 15.0000 | | |
| 11 | INF | 70.0000 | | |
| 12 | INF | −3.9523 | | |
| 13 | 16.8356 | 3.0324 | 1.49700 | 81.54 |
| 14 | INF | 0.1300 | | |
| 15 | 12.7726 | 3.2167 | 1.49700 | 81.54 |
| 16 | 19.9601 | 2.7687 | 1.48749 | 70.23 |
| 17 | 6.3912 | 5.6402 | | |
| 18 | −8.2650 | 1.2763 | 1.55836 | 54.01 |
| 19 | 9.8106 | 3.6739 | 1.43875 | 94.93 |
| 20 | −10.2087 | 6.5068 | | |
| 21 | INF | 4.5781 | 1.43875 | 94.93 |
| 22 | −11.8739 | 1.1100 | | |
| 23 | 35.6271 | 4.0793 | 1.56907 | 71.30 |
| 24 | −83.9358 | 0.2125 | | |
| 25 | 9.2112 | 2.7505 | 1.49700 | 81.54 |
| 26 | −55.2737 | 6.0670 | 1.67300 | 38.15 |
| 27 | 10.0179 | 3.8000 | | |
| 28 | INF | 0.1700 | 1.52100 | 56.02 |
| OBJ | INF | | | |

In the list above, "s" indicates a surface number, "r" indicates the radius (mm) of curvature, "d" indicates the surface interval (mm), "nd" indicates the refractive index with respect to the d-line, and "vd" indicates the Abbe number. "IMG" indicates an image plane, and "OBJ" indicates the sample surface. The surface numbers s2 through s7 indicate the lens surfaces of tube lens 8, and the surface numbers s13 through s27 indicate the lens surfaces of the objective 7. The surface number s8 indicates the position of the emission filter in the optical unit 20, and the surface number s9 indicates the position of the intersection of the dichroic mirror in the optical unit 20 and the optical axis. The surface number s10 indicates the position of the emission filter 11c in the optical unit 10, and the surface number s11 indicates the position of the intersection of the dichroic mirror 11a in the optical unit 10 and the optical axis. The surface number s12 indicates the contact surface of the objective 7, and the surface number s28 indicates the surface of the cover glass closest to the objective 7.

FIG. 7A illustrates the illumination distribution on the image plane when the sample surface becomes evenly luminous in cases where the filter block 11 is arranged on the optical axis in the optical unit 10 and the filter block 25 is arranged on the optical axis in the optical unit 20. FIG. 7B illustrates the illumination distribution on the image plane when the sample surface becomes evenly luminous in cases where the filter block 11 is arranged on the optical axis in the optical unit 10 and the filter block 21 is arranged on the optical axis in the optical unit 20.

As illustrated in FIG. 7A, when optical filters of the same size are used in the optical unit 10 closest to the objective 7 and the optical unit 20 closest to the tube lens 8, a light quantity of only about 56% is detected on the periphery of the field of the field number 22, that is, the image height of 11, relative to the central portion. On the other hand, as illustrated in FIG. 7B, when optical filters of different sizes are used between the optical unit 10 closest to the objective 7 and the optical unit 20 closest to the tube lens 8, a light quantity of about 84% may be detected on the periphery of the field of the field number 22 relative to the central portion.

Thus, using different optical filter sizes between the optical unit 10 closest to the objective 7 and the optical unit 20 closest to the tube lens 8, the occurrence of the vignetting of the off-axis light is considerably suppressed, and the shortage of the light quantity of the periphery may be improved. As a result, a large observation field may be secured.

Embodiment 2

Figure 8:
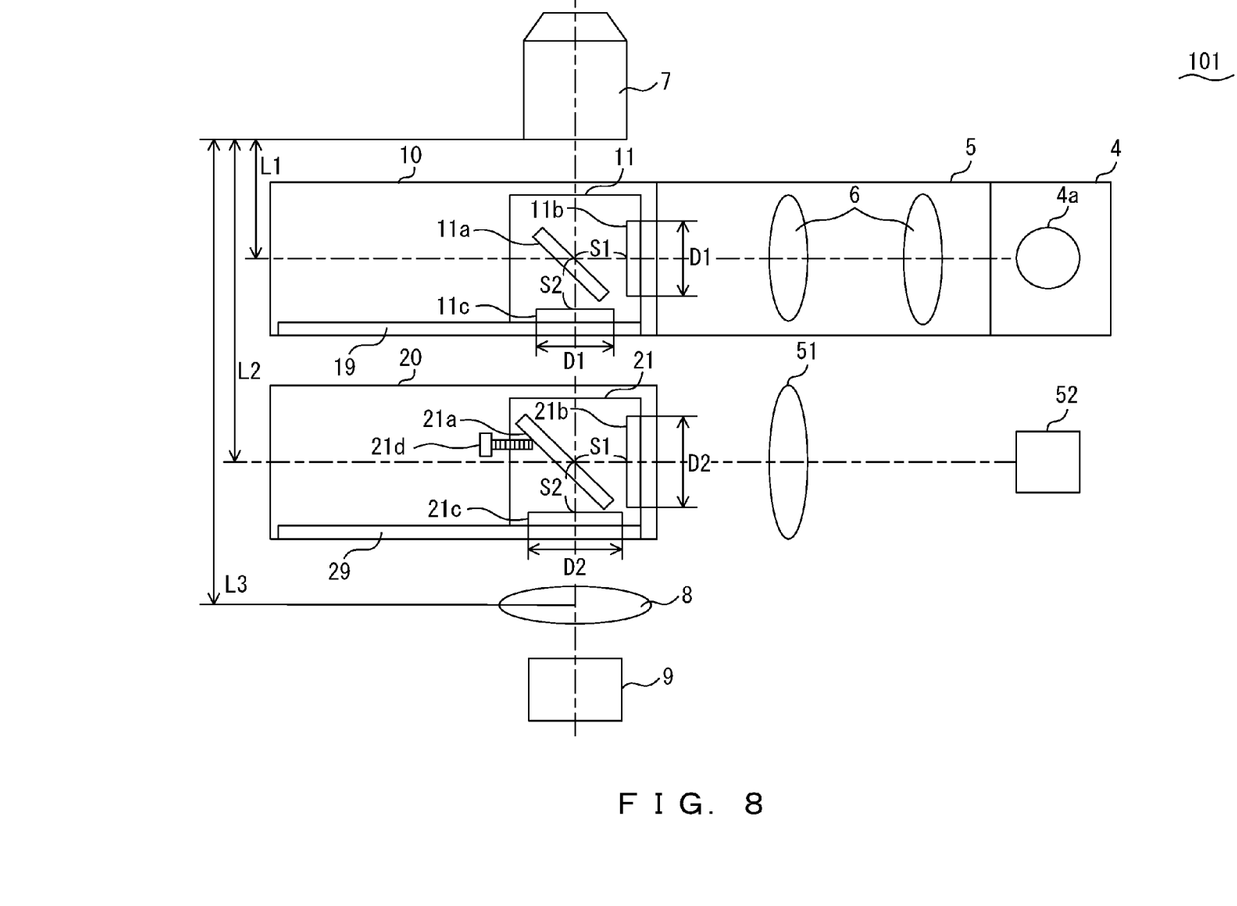
FIG. 8 is a diagram illustrating a configuration of the microscope according to embodiment 2 of the present invention.

FIG. 8 is a diagram illustrating a configuration of the microscope according to the present embodiment. A microscope 101 exemplified in FIG. 8 is an inverted microscope provided with a plurality of optical units (optical unit 10, optical unit 20) between the objective 7 and the tube lens 8 like the microscope 100 according to embodiment 1 exemplified in FIG. 1.

The microscope 101 is different from the microscope 100 in that a tube lens 51 and an image pickup element 52 are provided instead of the lamp house 4 and the projector tube 5, and that the lamp house 4 and the projector tube 5 are provided instead of the lamp house 1 and the projector tube 2. Otherwise, the configuration of the microscope 101 is the same as the configuration of the microscope 100, and the same components are assigned the same reference numerals, and the explanation is omitted here.

The optical unit 10 closest to the objective 7 is an optical unit which introduces the excitation light emitted from the excitation light source 4a in the lamp house 4 to the optical axis of the objective 7 through the lens group 6 in the projector tube 5. The excitation light introduced to the optical unit 10 is emitted to the entire sample through the objective 7, and derives, for example, a fluorescence resonance energy transfer (FRET) event.

The optical unit 20 closest to the tube lens 8 separates the fluorescence of two wavelengths caused by the FRET event, and introduces the fluorescence of one wavelength to the image pickup element 9 and the fluorescence of the other wavelength to the image pickup element 52. Therefore, with the microscope 101, the excitation filter 21b included in the filter block 21 functions as an emission filter which passes only the fluorescence to be detected.

Also with the microscope 101, like the microscope 100 according to embodiment 1 of the present invention, the effective diameter of the optical filter in the filter block 21 is larger than the effective diameter of the optical filter in the filter block 11, and the occurrence of the vignetting of the off-axis light in the filter block 21 closest to the tube lens 8 farthest from the objective 7 is suppressed, thereby reducing the degradation of the light quantity of the periphery. Therefore, using the microscope 101, a large observation field may be secured while providing various functions realized by a plurality of optical units, thereby obtaining the effect obtained by the microscope 100 according to embodiment 1.

In embodiments 1 and 2, the explanation is given with reference to the concrete configurations of a microscope, but the configuration of the microscope is not limited to the configuration of the microscope 100 according to embodiment 1 or the condition of the microscope 101 according to embodiment 2, and a number of variations are realized.

In FIGS. 1 and 8, a microscope provided with two optical units between the objective 7 and the tube lens 8 is exemplified, but the number of optical units is not limited to two. The number of optical units may be 2 or more, and an AF optical unit or the like may be further provided.

In addition, in FIGS. 1 and 8, a inverted microscope is exemplified. However, the application range of the present invention according to the present embodiment is not limited to the inverted microscope. Any microscope having a plurality of optical units between the objective 7 and the tube lens 8 may be likewise applied to an upright microscope.

Also in FIGS. 1 and 8, a configuration in which a lamp house is directly connected to a projector tube is exemplified, but an optical filter may be provided between the lamp house and the projector tube to suppress heat conductivity to the body of a microscope. Furthermore, as for a light source, it is not limited to a lamp light source, but any light source such as a laser light source or the like may be used.

Furthermore, in FIGS. 2A and 2B, the switch mechanism 29 as a turret system is exemplified as a switch mechanism for switching filter blocks, the switch mechanism is not limited to the turret system, but may be, for example, a sliding switch mechanism provided with a plurality of filter blocks.

In FIG. 2A, a switch mechanism 29 which may be provided with eight filter blocks is exemplified, but the switch mechanism may be provided with a plurality of filter blocks, and it is more preferable that six or more filter blocks be provided. Conventionally, when a filter block includes a dichroic mirror larger than a common dichroic mirror (hereafter referred to as an XL mirror), the filter block itself becomes larger. Therefore, the maximum number of filter blocks provided for a switch mechanism is different between the filter blocks of normal size and the filter blocks including the XL mirror. However, according to the microscope of each embodiment of the present invention, the same number of filter blocks are provided for a switch mechanism independently of the size of a dichroic mirror by maintaining the same size of filter blocks independently of the size of a dichroic mirror.

Furthermore, the optical unit 10 and the optical unit 20 may be configured as attachable to and detachable from the body of a microscope.

In addition, the optical unit 10 and the optical unit 20 may be appropriately added as necessary, or one of them may be removed.

With a plurality of optical units, since the configuration of a switch mechanism is common, the filter block provided for a switch mechanism may be appropriately replaced. Furthermore, a projector tube, an observation optical system, etc. attached to an optical unit is configured as attachable and detachable. With an optical unit, a filter block may be selected according to the positions of the projector tube and the observation optical system provided for a plurality of optical units, and according to the type of observation optical system.

What is claimed is:

1. A microscope having a plurality of optical units each including a filter block between an objective and a tube lens, the microscope comprising:
    a first optical unit closest to the objective from among the plurality of optical units, the first optical unit having a first filter block provided with a dichroic mirror and at least one optical filter which has a first effective diameter; and
    a second optical unit closest to the tube lens from among the plurality of optical units, the second optical unit having a second filter block provided with a dichroic mirror and at least one optical filter which has a second effective diameter that is larger than the first effective diameter;
    wherein each of the plurality of optical units is configured to be attachable to a plurality of filter blocks, and comprises a switch mechanism as a turret for selectively arranging one of the plurality of filter blocks on an optical axis of the objective;

wherein a first switch mechanism of at least one of the plurality of optical units is configured to be attachable to two types of filter blocks included in the plurality of filter blocks, wherein the two types of filter blocks include a filter block provided with at least one optical filter having the first effective diameter and a filter block provided with at least one optical filter having the second effective diameter, and the two types of filter blocks are interchangeable with each other on the first switch mechanism;

wherein the first filter block includes the at least one optical filter and the dichroic mirror in a unit that is attachable to and detachable from the switch mechanism of the first optical unit as a block; and wherein the second filter block includes the at least one optical filter and the dichroic mirror in a unit that is attachable to and detachable from the switch mechanism of the second optical unit as a block.

2. The microscope according to claim 1, wherein the dichroic mirror included in the second filter block is an octagon having four chamfered corners.

3. The microscope according to claim 2, wherein:
a chamfering angle of the dichroic mirror included in the second filter block is equal to or higher than 55 degrees and equal to or lower than 80 degrees; and
the microscope satisfies the condition:

$$0.3 \leq 2 \times C/S \leq 0.7,$$

where S indicates a length of a short side of the dichroic mirror included in the second filter block before a chamfering process, and C indicates a length, in a direction of the short side, of each chamfered portion formed at the four corners of the dichroic mirror included in the second filter block.

4. The microscope according to claim 1, wherein a maximum number of filter blocks attachable to the first switch mechanism when only filter blocks of a same type as the filter block provided with the at least one optical filter having the first effective diameter are provided is equal to a maximum number of filter blocks attachable to the first switch mechanism when only filter blocks of a same type as the filter block provided with the at least one optical filter having the second effective diameter are provided.

5. The microscope according to claim 1, wherein the dichroic mirror included in the second filter block is coated with an interference coating on both sides of a substrate.

6. The microscope according to claim 1, further comprising a device configured to adjust a tilt of the dichroic mirror included in the second filter block.

7. The microscope according to claim 1, wherein the microscope satisfies the condition: $1.1 \leq D2/D1 \leq 1.5$, where D1 is the first effective diameter and D2 is the second effective diameter.

8. The microscope according to claim 7, wherein the microscope further satisfies the condition: $12 < f \times (D2-D1)/(L2-L1) < 31$,
where f indicates a focal length of the tube lens, L1 indicates a distance from a contact surface of the objective to an intersection of the optical axis of the objective and the dichroic mirror included in the first filter block, and L2 indicates a distance from the contact surface of the objective to an intersection of the optical axis of the objective and the dichroic mirror included in the second filter block.

9. The microscope according to claim 1, wherein a size of the first filter block is equal to a size of the second filter block.

10. The microscope according to claim 1, wherein the first filter block includes the dichroic mirror and two optical filters, and
wherein the second filter block includes the dichroic mirror and two optical filters.

11. A microscope having a plurality of optical units each including a filter block between an objective and a tube lens, the microscope comprising:
a first optical unit closest to the objective from among the plurality of optical units, the first optical unit having a first filter block provided with a dichroic mirror and at least one optical filter which has a first effective diameter; and
a second optical unit closest to the tube lens from among the plurality of optical units, the second optical unit comprising (i) a switch mechanism, (ii) a second filter block provided with a dichroic mirror and at least one optical filter which has a second effective diameter larger than the first effective diameter, the second filter block being detachably mounted on the switch mechanism, and (iii) a third filter block provided with a dichroic mirror and at least one optical filter which has the first effective diameter, the third filter block being detachably mounted on the switch mechanism;
wherein the switch mechanism is configured to selectively arrange the second filter block or the third filter block on an optical axis of the objective;
wherein the second filter block includes the at least one optical filter and the dichroic mirror in a unit that is attachable to and detachable from the switch mechanism of the second optical unit as a block;
wherein the third filter block includes the at least one optical filter and the dichroic mirror in a unit that is attachable to and detachable from the switch mechanism of the second optical unit as a block; and
wherein the second filter block and the third filter block have common attachment units such that the second filter block and the third filter block are replaceable with each other on the switch mechanism.

12. The microscope according to claim 11, wherein the second optical unit includes a plurality of second filter blocks and a plurality of third filter blocks detachably mounted on the switch mechanism.

13. The microscope according to claim 11, wherein the first filter block includes the dichroic mirror and two optical filters,
wherein the second filter block includes the dichroic mirror and two optical filters, and
wherein the third filter block includes the dichroic mirror and two optical filters.

* * * * *